(12) United States Patent  
Yano

(10) Patent No.: US 9,302,712 B2  
(45) Date of Patent: Apr. 5, 2016

(54) VEHICLE BODY FRONT STRUCTURE

(71) Applicant: Norimasa Yano, Nissin (JP)

(72) Inventor: Norimasa Yano, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/416,252

(22) PCT Filed: Aug. 26, 2013

(86) PCT No.: PCT/IB2013/001833  
§ 371 (c)(1),  
(2) Date: Jan. 21, 2015

(87) PCT Pub. No.: WO2014/033523  
PCT Pub. Date: Mar. 6, 2014

(65) Prior Publication Data  
US 2015/0175214 A1   Jun. 25, 2015

(30) Foreign Application Priority Data

Aug. 30, 2012 (JP) ................................. 2012-190036

(51) Int. Cl.  
*B60J 7/00*   (2006.01)  
*B62D 25/08*   (2006.01)  
*B60K 11/04*   (2006.01)

(52) U.S. Cl.  
CPC .............. *B62D 25/084* (2013.01); *B60K 11/04* (2013.01)

(58) Field of Classification Search  
CPC .............. B60K 11/04; B60K 15/0406; H01L 2924/00; H01L 2924/00014; H01L 2924/0406; F28F 9/002; F28F 2275/143; B64G 1/503

USPC ........................ 296/193.09, 203.02; 180/68.4  
See application file for complete search history.

(56) References Cited

U.S. PATENT DOCUMENTS

| | | | |
|---|---|---|---|
| 6,634,702 B1 * | 10/2003 | Pleschke | B60R 19/18 293/102 |
| 6,679,545 B1 | 1/2004 | Balzer et al. | |
| 6,827,129 B2 * | 12/2004 | Ozawa | B60K 11/04 165/140 |
| 6,973,984 B2 * | 12/2005 | Cheron | B62D 29/04 180/68.1 |

(Continued)

FOREIGN PATENT DOCUMENTS

| | | | |
|---|---|---|---|
| DE | 101 49 443 A1 | 5/2002 | |
| EP | 2 394 885 A1 | 12/2011 | |

(Continued)

OTHER PUBLICATIONS

Dec. 18, 2013 Written Opinion of the International Searching Authority issued in International Application No. PCT/IB2013/001833.

*Primary Examiner* — Kiran B Patel  
(74) *Attorney, Agent, or Firm* — Oliff PLC

(57) ABSTRACT

In a radiator support connection member, a low rigidity section is provided in a fender bracket side such that rigidity in the fender bracket side is set lower than rigidity of a radiator support. Because the fender bracket side of the radiator support connection member is likely to be plastically deformed, it is possible to secure energy absorbing performance. In addition, it is possible to make a rigidity of a coupling section of the radiator support connection member an appropriate rigidity by coupling a side section of the radiator support connection member in the radiator support side with high rigidity to a side section of the radiator support at a plurality of coupling spots.

5 Claims, 3 Drawing Sheets

(56) References Cited

U.S. PATENT DOCUMENTS

| | | | | |
|---|---|---|---|---|
| 7,325,863 B2* | 2/2008 | Uchiyama | B62D 27/06 | 296/193.09 |
| 7,686,490 B2* | 3/2010 | Tazaki | B60Q 1/0433 | 362/523 |
| 7,735,226 B2* | 6/2010 | Riviere | B29C 45/1418 | 29/897.2 |
| 7,887,125 B2* | 2/2011 | Tazaki | B60R 19/52 | 296/187.09 |
| 7,926,870 B2* | 4/2011 | Lorenzo | B62D 25/084 | 296/193.1 |
| 8,517,461 B2* | 8/2013 | Huber | B62D 25/084 | 293/120 |
| 8,789,874 B2* | 7/2014 | Okamura | B60R 19/12 | 180/68.4 |
| 8,979,180 B2* | 3/2015 | Townson | B62D 25/085 | 296/193.09 |
| 9,056,634 B2* | 6/2015 | Watanabe | B62D 21/152 | |
| 9,132,794 B2* | 9/2015 | Nagaya | B60R 19/34 | |
| 9,157,720 B2* | 10/2015 | Townson | G01B 5/0025 | |
| 2005/0088015 A1* | 4/2005 | Kishikawa | B60Q 1/0425 | 296/193.09 |
| 2009/0058135 A1* | 3/2009 | Murata | B62D 21/11 | 296/187.09 |
| 2010/0060039 A1* | 3/2010 | Riviere | B60K 11/04 | 296/193.09 |
| 2010/0078149 A1* | 4/2010 | Yoshimitsu | B60K 11/04 | 165/67 |
| 2010/0231006 A1* | 9/2010 | Okabe | B62D 25/084 | 296/203.02 |
| 2012/0019027 A1* | 1/2012 | Tashiro | B60R 19/02 | 296/193.09 |
| 2013/0026791 A1* | 1/2013 | Huber | B60R 19/24 | 296/193.09 |
| 2013/0161979 A1* | 6/2013 | Abe | B62D 25/084 | 296/193.09 |
| 2014/0062140 A1* | 3/2014 | Townson | B62D 25/085 | 296/193.09 |
| 2015/0115664 A1* | 4/2015 | Mildner | B62D 25/082 | 296/203.02 |

FOREIGN PATENT DOCUMENTS

| | | |
|---|---|---|
| FR | 2 912 107 A1 | 8/2008 |
| JP | 2005-145271 A | 6/2005 |
| JP | 2007-331614 A | 12/2007 |
| JP | 2008-254681 A | 10/2008 |
| JP | 2012-071675 A | 4/2012 |

* cited by examiner

VEHICLE BODY FRONT STRUCTURE

BACKGROUND OF THE INVENTION

1. Field of the Invention

The present invention relates to a vehicle body front structure.

2. Description of Related Art

A vehicle body front structure disclosed in Japanese Patent Application Publication No. 2007-331614 (JP 2007-331614 A) has been known, for example. In the vehicle body front structure disclosed in JP 2007-331614 A, when a predetermined or more load acts on a connection member that connects an apron and a radiator support, the connection member is released from the radiator support or the apron to increase a deformation stroke of a hood.

In the above structure, because the connection member can be released from the radiator support, there is possible deterioration in rigidity of a coupling section between the connection member and the radiator support against a force applied to the connection member.

SUMMARY OF THE INVENTION

The present invention provides a vehicle body front structure that can secure energy absorbing performance with an appropriate rigidity of a coupling section between a radiator support and a connection member.

A first aspect of the present invention relates to a vehicle body front structure that includes: a radiator support that is disposed in a front side of a vehicle body front section in a vehicle body fore-aft direction and includes a pair of side members of the radiator support, each longitudinal direction of which coincides with a vehicle body height direction; an apron upper member that is disposed in both sides of the vehicle body front section in a vehicle body width direction along the vehicle body fore-aft direction. The vehicle body front structure has a radiator support connection member includes a base section that includes a coupling section coupled to the side member of the radiator support; and a low rigidity section whose rigidity is set lower than a rigidity of the base section, that is provided in the apron upper member side, and to which a fender bracket for supporting an end of a fender panel in an inner side with respect to the fender panel in the vehicle body width direction is attached. The fender panel constitutes an outer side surface of the vehicle body front section. The radiator support connection member connects an upper section of the side member of the radiator support in the vehicle body height direction to a front end section of the apron upper member in the vehicle body longitudinal direction.

Because the radiator support connection member is provided with the low rigidity section whose rigidity is set lower than the base section that includes the coupling section coupled to the side member of the radiator support, the fender bracket side thereof is more likely to be plastically deformed than the base section side thereof. Therefore, the radiator support connection member can secure a stroke of plastic deformation when an impact load is applied downward in the vehicle body height direction to the radiator support connection member from the fender bracket.

Furthermore, because the rigidity of the base section including the coupling section coupled to the side member of the radiator support is set higher than that of the low rigidity section in the radiator support connection member, it is possible to make the rigidity of the coupling section an appropriate rigidity.

A cross-sectional area of the radiator support side may be set larger than a cross-sectional area of the fender bracket side of the radiator support connection member when the radiator support connection member is cut in a direction perpendicular to a longitudinal direction thereof.

Accordingly, a second area moment of the radiator support connection member becomes relatively high in the radiator support side and relatively low in the fender bracket side.

The radiator support connection member may be set such that its cross-sectional height in the radiator support side is greater than its cross-sectional height in the fender bracket side when it is cut in the direction perpendicular to the longitudinal direction thereof.

Because the cross-sectional height in the radiator support side is set to be greater than the cross-sectional height in the fender bracket side in the radiator support connection member, the second area moment second area moment of the radiator support connection member is relatively high in the radiator support side and relatively low in the fender bracket side.

The coupling section is provided in a portion where a side section in which the cross-sectional height of the radiator support connection member is set to be high overlaps with a side section of the side member of the radiator support. In the coupling section, the radiator support connection member may be coupled to the side member of the radiator support at a plurality of positions.

Because the coupling section is provided in the portion where the side section in which the cross-sectional height of the radiator support connection member is set to be high overlaps with the side section of the side member of the radiator support, a large area can be obtained for the coupling section. Furthermore, because the radiator support connection member is coupled to the radiator support at the plurality of positions in the coupling section with the large area, the rigidity of the coupling section can be increased.

It is possible to secure energy absorbing performance with an appropriate rigidity of the coupling section between the radiator support connection member and the radiator support side.

It is possible to induce the plastic deformation of the fender bracket side of the radiator support connection member.

The above-configuration of the radiator support connection member is effective to differentiate the second area moment in the radiator support side from the second area moment in the fender bracket side.

Because the coupling section between the radiator support connection member and the radiator support is restricted from being deformed, this leads to restriction of deformation of the vehicle body. Accordingly, it is possible to restrict degradation in steering stability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
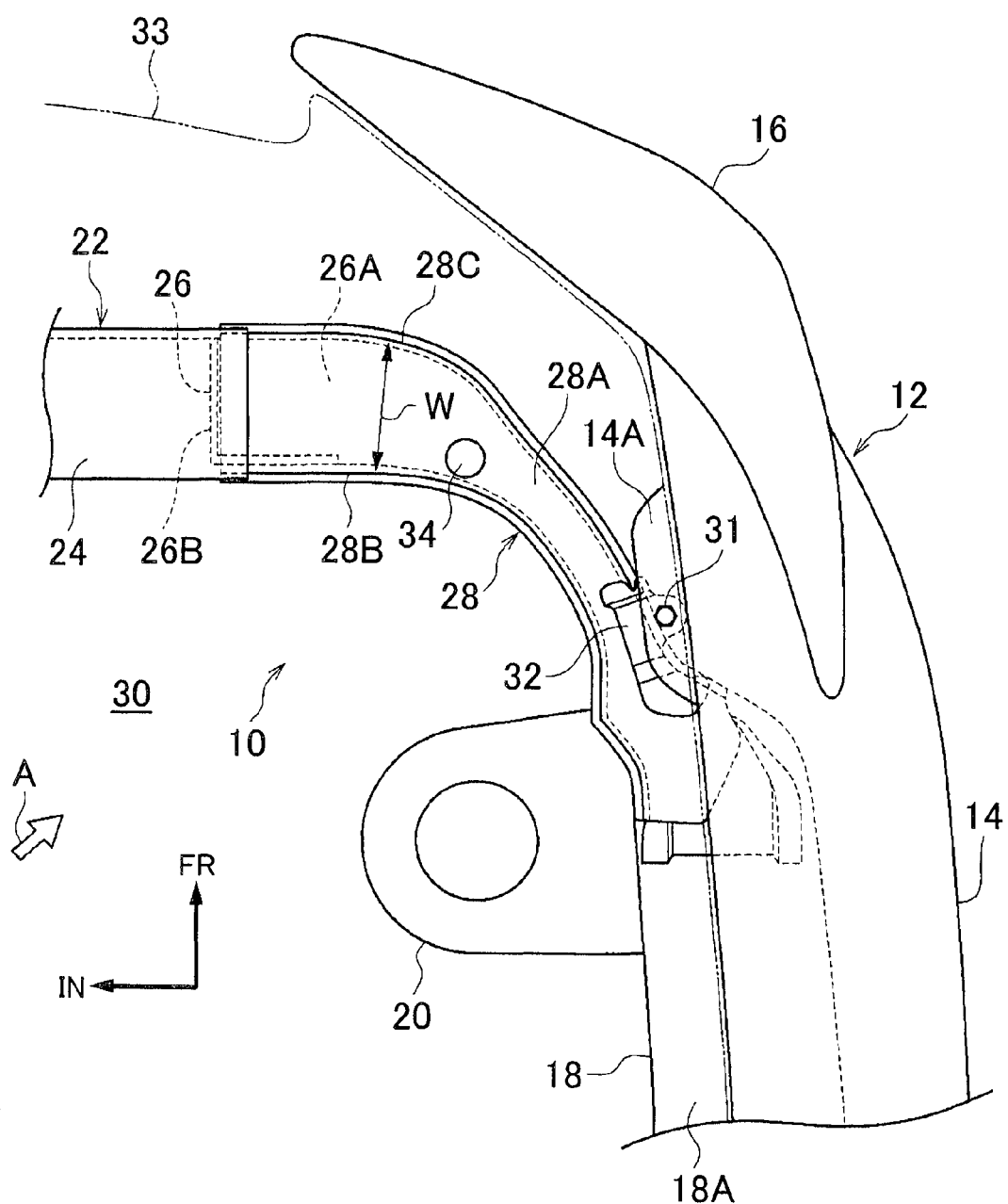
FIG. 1 is an enlarged plan view for showing main components of a vehicle body front structure according to an embodiment of the present invention.
Figure 2:
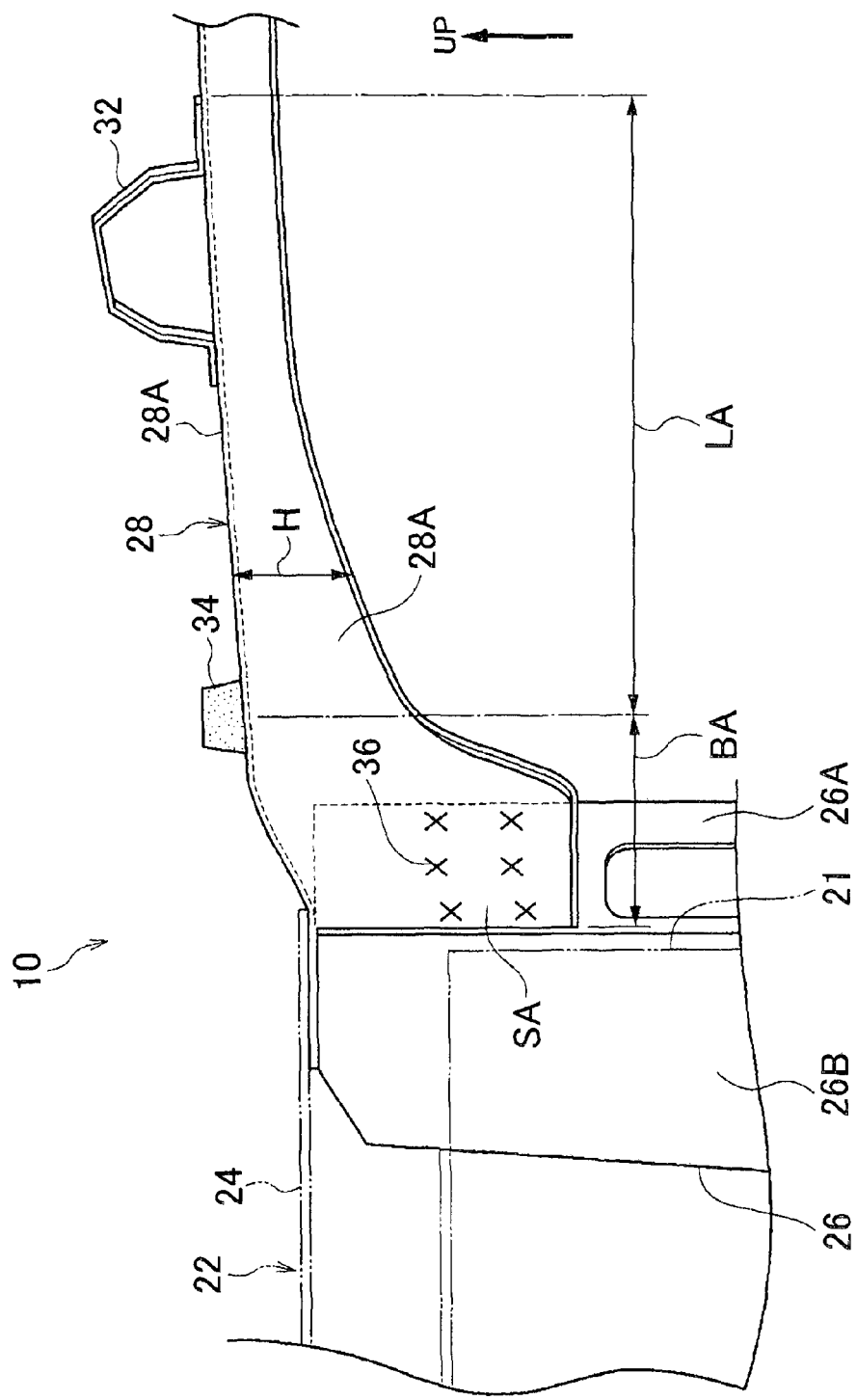
FIG. 2 is a perspective view for showing the main components of the vehicle body front structure in FIG. 1 that are seen from an engine compartment side in a front and diagonal direction to the right (a view of the main components that are seen in an arrow A direction of FIG. 1)
Figure 3:
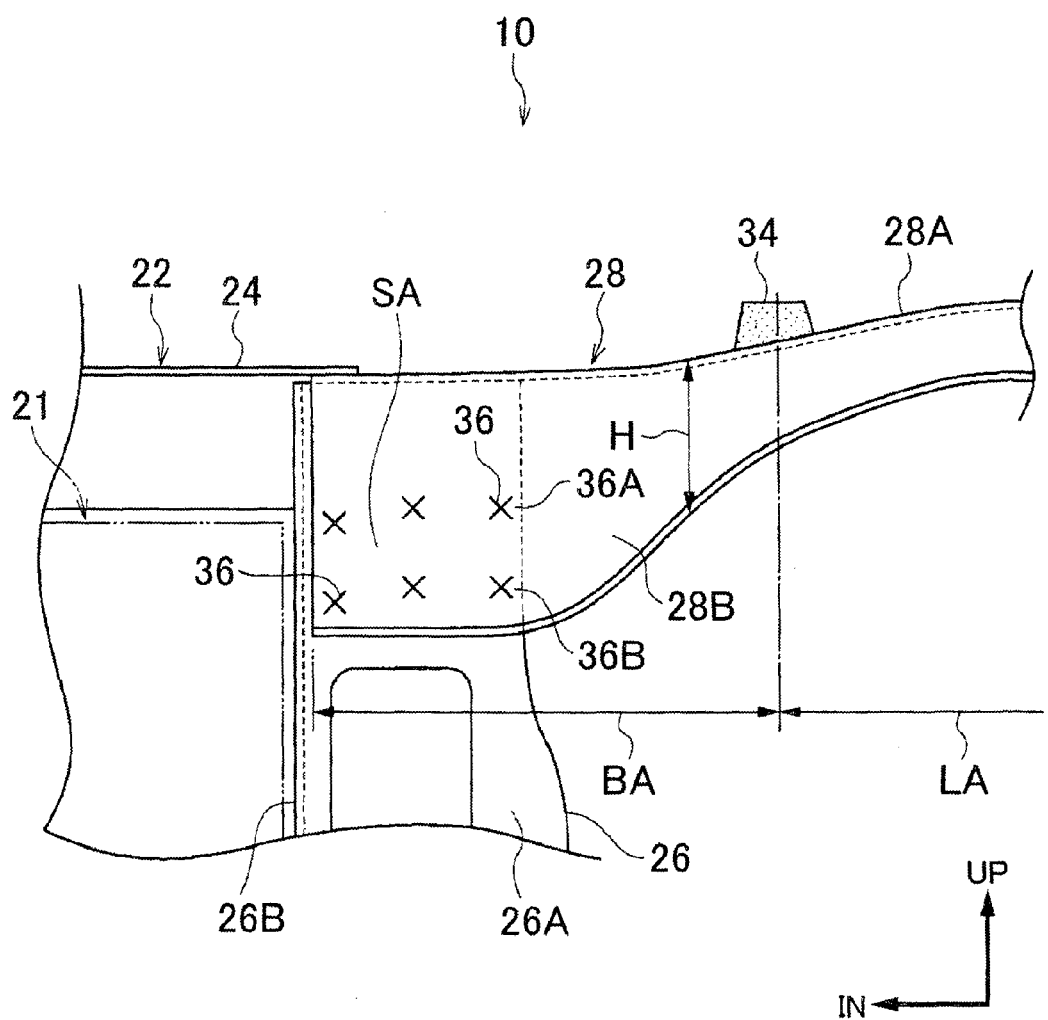
FIG. 3 is a back view of a coupling section between a radiator support and an upper side member of a radiator support shown in FIG. 1.

A description will hereinafter be made on embodiments of the present invention with reference to the accompanying drawing. FIG. 1 is a plan view of a vehicle body front structure 10 according to this embodiment, FIG. 2 is a perspective view of the vehicle body front structure 10 according to this embodiment that is seen from an engine compartment side in a front and diagonal direction to the right, and FIG. 3 is a back view of a part of the vehicle body front structure 10 according to this embodiment that is seen from a rear side of a vehicle body. Here, arrows FR, UP, and IN that are appropriately shown in each of the drawings respectively indicate a vehicle body front direction, a vehicle body upward direction, and an inner side in a vehicle body width direction.

(An Outline of a Vehicle Body Front Structure)

In the vehicle body front structure 10 shown in FIG. 1, a right and left pair of front fender panels 14 is disposed in a front portion of a vehicle body along a vehicle body fore-aft direction on both sides of a vehicle body 12 in the vehicle body width direction (only a right side of the vehicle body is shown in FIG. 1). A headlamp 16 is disposed in the vehicle body front side of the front fender panel 14. An apron upper member 18 that extends in the vehicle body fore-aft direction and has a closed cross-section structure is provided on the inner side of the front fender panel 14 in the vehicle body width direction. A suspension tower 20 is connected to the apron upper member 18.

As shown in FIG. 1 and FIG. 2, a frame-shaped radiator support 22 for supporting a heat exchanger 21 such as a radiator is provided in the front section of the vehicle body 12. The radiator support 22 includes: a radiator support upper 24 that constitutes an upper section of the frame and extends in the vehicle body width direction; a right and left pair of the side members 26 of the radiator support that constitutes both sides of the frame and extends in a vehicle body height direction; and a radiator support lower (not shown) that constitutes a lower section of the frame and extends in the vehicle body width direction. The side member 26 of the radiator support is substantially L shaped in a plan view and includes a rear wall 26A whose width direction corresponds to the vehicle body width direction and a side wall 26B that extends from an end of the rear wall 26A in the radiator side toward the front of the vehicle body. The radiator support upper 24 and the side member 26 of the radiator support of this embodiment are each formed of a metal plate such as a steel plate.

(A Structure of a Radiator Support Connection Member)

A radiator support connection member (also referred to as an upper side member of a radiator support) 28 that connects the radiator support upper 24 to an upper surface 18A of the apron upper member 18 is disposed on the inner side of the front fender panel 14 in the vehicle width direction. The radiator support connection member 28 of this embodiment is formed of a metal plate in specified thickness such as a steel plate.

The radiator support connection member 28 includes an upper wall 28A in a substantially curved shape that is projected toward a headlamp side in a plan view, an inner vertical wall 28B that extends downward from an edge of the upper wall 28A in an engine compartment 30 side, and an outer vertical wall 28C that extends downward from an edge of the upper wall 28A in an opposite side from the engine compartment 30 side.

A fender bracket 32 as a connection section is coupled to the upper wall 28A of the radiator support connection member 28 in the apron upper member 18 side. The fender bracket 32 is connected to a flange 14A that is formed in the front fender panel 14 by a bolt 31, for example. Furthermore, a hood stopper 34 that supports a hood 33 and is formed of a rubber or the like is attached between the fender bracket 32 and the radiator support 22 in the upper wall 28A. Here, the upper wall 28A of this embodiment is set such that a width W thereof gradually decreases from the radiator support 22 toward the fender bracket 32.

As shown in FIG. 2, a height H (vertical dimension) of the inner vertical wall 28B of the radiator support connection member 28 is set to be the highest in the radiator support 22 side, to gradually decrease toward the fender bracket 32, and to be the lowest in the vicinity of the fender bracket 32. The height H of the inner vertical wall 28B of this embodiment is constant in a portion thereof that overlaps with the rear wall 26A of the side member 26 of the radiator support, and the height H gradually decreases from an end of the rear wall 26A in the width direction toward the fender bracket 32. Although not shown, like the inner vertical wall 28B, a height (vertical dimension) of the outer vertical wall 28C is set to be the highest in the vicinity of the radiator support 22 and to gradually decrease toward the fender bracket 32. In this embodiment, an area of the radiator support connection member 28 from a portion below the hood stopper 34 to a portion below the fender bracket 32 is referred to as a low rigidity section LA, and an area of the radiator support connection member 28 in the radiator support 22 side from the low rigidity section LA is referred to as a base section BA (see FIGS. 2, 3).

As described above, the height H of the inner vertical wall 28B and that of the outer vertical wall 28C gradually decrease toward the fender bracket 32, and the width W of the upper wall 28A gradually decreases toward the fender bracket 32. Accordingly, a cross-sectional area of the radiator support connection member 28 in a direction that intersects the longitudinal direction thereof, i.e., in a perpendicular direction of the longitudinal direction is set to be relatively large in the radiator support 22 side and small in the fender bracket 32 side. Therefore, a second area moment that is related to bending of the radiator support connection member 28 in the height direction is set to be relatively high in the radiator support 22 side and low in the fender bracket 32 side. It should be noted here that an average height between the height H of the inner vertical wall 28B and the height H of the outer vertical wall 28C in the radiator support connection member 28 can be regarded as a cross-sectional height in the present invention.

(Coupling Between the Radiator Support Connection Member and the Radiator Support)

As shown in FIG. 2 and FIG. 3, a portion of the inner vertical wall 28B in the radiator support connection member 28 whose height H in the radiator support side is set to be the highest overlaps with the rear wall 26A of the side member 26 of the radiator support that constitutes the radiator support 22.

Then, in a portion where the inner vertical wall 28B overlaps with the rear wall 26A, the inner vertical wall 28B is coupled to the rear wall 26A at a plurality of spots. In this embodiment, spots where the inner vertical wall 28B is coupled to the rear wall 26A are hereinafter referred to as coupling spots 36 (portions represented by "X" in FIG. 2 and FIG. 3). In this embodiment, the coupling spots 36 are spot welded. However, the coupling spots 36 can adopt another coupling structure such as welding other than spot welding, bolting, riveting, or swaging.

As shown in FIG. 3, in this embodiment, the plural coupling spots 36 (three in this embodiment) form a line in an upper side of the inner vertical wall 28B along the longitudinal direction of the radiator support connection member 28, and this line is referred to as a first coupling spot line 36A in this embodiment. Also, the plural coupling spots 36 (three in this embodiment) form a line below the first coupling spot line 36A along the longitudinal direction of the radiator support connection member 28, and this line is referred to as a second coupling spot line 36B in this embodiment. A number of the coupling spots 36 per line are preferably two or more, and a total number of the coupling spots 36 are preferably four or more. An area surrounded by the plural coupling spots 36 is hereinafter referred to as a coupling section SA in this embodiment.

(Actions and Effects of this Embodiment)

In the vehicle body front structure 10 of this embodiment, when a collision body collides with the front fender panel 14 from above, for example, a downward collision load in the vehicle body height direction acts on the radiator support connection member 28 through the front fender panel 14 and the fender bracket 32.

The low rigidity section LA is provided in the radiator support connection member 28, and the rigidity of the radiator support connection member 28 is set lower in the fender bracket 32 side than in the radiator support 22 side. Accordingly, the fender bracket 32 side of the radiator support connection member 28 can be plastically deformed downward in the vehicle body height direction by the collision load from above. This plastic deformation allows the radiator support connection member 28 to effectively absorb impact energy, that is, to secure energy absorbing performance.

Meanwhile, when the collision body collides with the hood 33 from above, a downward collision load in the vehicle body height direction acts on the radiator support connection member 28 through the hood stopper 34. Also, in this case, the fender bracket side of the radiator support connection member 28 can be plastically deformed downward by the collision load and thus can effectively absorb the impact energy. It should be noted that the radiator support connection member 28 includes the low rigidity section LA; however, the basic rigidity required during normal time is secured. For example, the radiator support connection member 28 is not plastically deformed by a load of the radiator support 22, a force applied from the suspension tower 20 (a force applied from a road surface), a load of the hood 33 (including a collision load during opening and closing), and other loads and forces acting during the normal time.

Furthermore, in the vehicle body front structure 10 of this embodiment, because a portion of the inner vertical wall 28B in the radiator support connection member 28 that has the great height H and the large area overlaps with the rear wall 26A of the radiator support 22, the area where the inner vertical wall 28B overlaps with the rear wall 26A is set to be large. In addition, the second area moment in a portion of in the radiator support connection member 28 that is coupled to the radiator support 22 is set to be the highest. Furthermore, in the large area where the inner vertical wall 28B overlaps with the rear wall 26A, the radiator support connection member 28 is coupled to the radiator support 22 at the plural coupling spots 36 that include the first coupling spot line 36A and the second coupling spot line 36B. Accordingly, it is possible to secure the high rigidity in the coupling section SA. Therefore, it is possible to obtain the following effects in the vehicle body front structure 10.

(1) Because the load or force from the radiator support connection member 28 is shared by the plural coupling spots 36, stress acting on each of the coupling spots 36 can be reduced.

(2) It is possible to restrict the deformation of the coupling section SA by the force that is transmitted through the suspension SA and the apron upper member 18 (a force from the suspension tower 20 due to a force from a tire as an example).

(3) Because the right and left apron upper members 18 are connected by the radiator support 22 and the radiator support connection member 28, each of the radiator support 22 and the radiator support connection member 28 has a function as a reinforcing member that contributes to the improvement in the rigidity of the vehicle body. Therefore, the restriction of deformation of the coupling section SA leads to the restriction of deformation of the vehicle body, and consequently, steering stability can be improved.

(4) Because the high rigidity is secured in the coupling section SA, durable strength of the vehicle body can be improved.

(5) Furthermore, the durable strength of the coupling section SA and the rigidity of the vehicle body can be improved without thickening the plate thickness of the radiator support connection member 28, and the weight of the radiator support connection member 28 can be reduced.

OTHER EMBODIMENTS

The embodiment of the present invention has been described so far. However, the present invention is not limited thereto. Needless to say, various modifications can be made without departing from the gist of the present invention.

The shape of the radiator support connection member 28 is not limited to that in the above embodiment. For example, in the radiator support connection member 28, the height H of the inner vertical wall 28B and that of the outer vertical wall 28C may at least be reduced from the radiator support 22 side to the fender bracket 32 side. In addition, the width W of the upper wall 28A may be reduced from the radiator support 22 to the fender bracket 32 side as necessary.

In the radiator support connection member 28 of the above embodiment, the low rigidity section LA is formed between the hood stopper 34 and the fender bracket 32. However, a range of the low rigidity section LA is not limited to a range in the above embodiment and can appropriately be changed. Similarly, a range of the base section BA is not limited to a range in the above embodiment and can appropriately be changed.

The radiator support connection member 28 can support a load of the headlamp 16. In addition, the hood stopper 34 may not be provided in the radiator support connection member 28.

(Supplementary Note)

In order to facilitate the plastic deformation of the fender bracket 32 side of the radiator support connection member 28, and also to satisfy both of "the securement of the energy absorption performance" and "an appropriate rigidity of the coupling section", it is preferred to configure the radiator support connection member 28 as follows.

(1) The second area moment (an average value) of the lower rigidity section LA is preferably 50% or lower of the second area moment (an average value) of the base section BA.

(2) The length of the lower rigidity section LA that is measured along the longitudinal direction of the radiator support connection member 28 is preferably set longer than the length of the base section BA.

(3) The length of the low rigidity section LA is preferably 30% or longer of the total length of the radiator support connection member 28.

(4) The length of the base section BA is preferably 20% or longer of the total length of the radiator support connection member 28. As described above, it is natural that the radiator support connection member 28 has to secure the basic rigidity that is required during the normal time.

What is claimed is:

1. A vehicle body front structure comprising:
   a radiator support that is disposed in a front side of a vehicle body front section in a vehicle body fore-aft direction and includes (i) a pair of side members of the radiator support, each longitudinal direction of which coincides with a vehicle body height direction and (ii) a radiator support upper that constitutes an upper section of the radiator support and extends in a vehicle body width direction;
   an apron upper member that is disposed in both sides of the vehicle body front section in a vehicle body width direction along the vehicle body fore-aft direction; and
   a radiator support connection member that includes
      a base section including a coupling section coupled to the side member and the radiator support upper, and
      a low rigidity section whose rigidity is set lower than a rigidity of the base section, that is provided in an apron upper member side, and to which a fender bracket for supporting an end of a fender panel in an inner side with respect to the fender panel in the vehicle body width direction is attached, the fender panel constituting an outer side surface of the vehicle body front section,
   wherein the radiator support connection member connects an upper section of the side member in the vehicle body height direction to a front end section of the apron upper member in the vehicle body fore-aft direction.

2. The vehicle body front structure according to claim 1, wherein
   the radiator support connection member is set such that a cross-sectional area of the radiator support connection member in a radiator support side is larger than the cross-sectional area of the radiator support connection member in a fender bracket side when the radiator support connection member is cut in a direction perpendicular to a longitudinal direction of the radiator support connection member.

3. The vehicle body front structure according to claim 2, wherein
   the radiator support connection member includes a side section whose cross-sectional height in the radiator support side is greater than the cross-sectional height in the fender bracket side when the radiator support connection member is cut in the direction perpendicular to the longitudinal direction of the radiator support connection member.

4. The vehicle body front structure according to claim 3, wherein
   the coupling section is provided in a portion where the side section overlaps with a side section of the side member, and
   the radiator support connection member is coupled to the side member at a plurality of positions in the coupling section.

5. The vehicle body front structure according to claim 1, wherein
   the rigidity of the low rigidity section is set such that the rigidity of the low rigidity section gradually decreases from a radiator support side toward a fender bracket side.

* * * * *